DEVICE FOR GENERATING OR MEASURING PRESELECTED FREQUENCY SIGNALS

Filed July 17, 1967 2 Sheets-Sheet 1

INVENTOR
THOMAS J. REY
BY,
Richard F. Beneway
ATTORNEY

INVENTOR
THOMAS J. REY
BY,
Richard F. Benway
ATTORNEY 3,514,698
DEVICE FOR GENERATING OR MEASURING PRESELECTED FREQUENCY SIGNALS Thomas J. Rey, Nashua Road, Billerica, Mass. 01730

Filed July 17, 1967, Ser. No. 653,835
Int. Cl. G01r *23/00;* H03b *3/04*
U.S. Cl. 324—79 8 Claims

ABSTRACT OF THE DISCLOSURE

This invention is a frequency synthesizer wherein an integrated digital error signal from an accumulator is used to control the frequency output of a variable frequency oscillator. Pulse signals in a closed loop are pre-positioned and compared to develop an error signal. By means of a stroboscopic sampling of the phase difference between signals where they are within specified ranges, fine tuning is provided. Alternatively, when stroboscopic sampling for fine tuning is not used, detecting the output of a difference detector and comparing signals in a threshold switch eliminates hunting when quiescence between signals is approached.

The method and means described in the ensuing application find their greatest application in frequency generation and in frequency measurement. There are a wide variety of frequency generators, the simplest being the free-running oscillator and the crystal control oscillator. The present invention is directed to a free-running oscillator which is disciplined by a crystal controlled oscillator through digital means. This process is captioned "Digital Rate Synthesis." Digital rate synthesis for frequency measurement and control was first published as an IRE publication in 1958 by the present inventor. In this publication, the distinguishing features and general attributes of this method of frequency synthesis were discussed in some detail.

The inventor subsequently discovered by processing the output of the difference detector in an accumulator, which in essence is a simple up-down counter, the output is thereby integrated. The accumulator applies a signal corresponding to the state of the accumulator to the free-running oscillator which has an output constantly monitored by the state of the accumulator. Use of the accumulator in place of a motor, as disclosed in the above publication, provides much higher speed than otherwise would be available and eliminates the bulk, weight, and cost usually associated with such apparatus. The present invention requires the variable frequency oscillator to be stepwise tunable.

It will be noted that a motor has substantial power requirements. A static device contemplated by the present inventor, being in an advanced state of microelectronics, will have negligible power requirements.

The inventor also discovered that when the output of his mean signal is compared with the output of his variable frequency oscillator and applied to the difference detector, that if these signals were other than coincident or well-spaced, the circuitry failed to respond correctly and spurious signals would therefore be generated. In order to overcome this difficulty, the output of the variable frequency oscillator had to be positioned properly with reference to the master oscillator signal.

This latter discovery is implemented by effectively retiming the output of the variable frequency oscillator, and is accomplished by multiplying the output of the master oscillator and comparing the output of the variable frequency oscillator such that a pulse output of the variable frequency oscillator occurs only in correspondence with said multiple of the master oscillator. However, the number of pulses produced by the variable frequency oscillator remains unaffected.

The inventor has also discovered that the system when it approaches a quiescent point exhibits certain instability for hunting. To overcome this, the error signal is applied to a threshold circuit which switches the input to the accumulator off, when a designated threshold is crossed. Hunting can also be overcome by means of phase lock, which provides continuous control.

The application of Digital Rate Synthesis to the measurement of frequency or rate has been discussed in the aforementioned publication and offers to provide measuring means that are more economical and compact than conventional counters. The change from a frequency synthesizer to a frequency meter requires that the error signal be used to control the settings of the rate synthesizer, either manually or automatically. In manual operation, the operator controls the digit switches so as to minimize the magnitude of the error signal; the accumulator is not used. In the automatic mode, the digit switches of the rate synthesizer are controlled by the accumulator, but it is necessary for the accumulator state to be read out, for instance, by numeric indicators.

Therefore, an object of the present invention is to provide a frequency synthesizer having no moving parts.

Another object of the present invention is to provide a compact, reliable, low-cost frequency synthesizer, composed of all static components.

Another object of the present invention is to provide a stable frequency synthesizer.

Another object of the present invention is to provide a frequency synthesizer having pulse positioning to eliminate instability due to improperly spaced pulses.

Another object of this present invention is to provide a frequency synthesizer having a threshold switch which eliminates hunting.

Another object of the present invention is to provide a frequency synthesizer having phase lock for fine tuning.

Other objects, features, and advantages of the present invention will be better understood from the following specification when read in conjunction with the attached drawings, of which:

Figure 1:
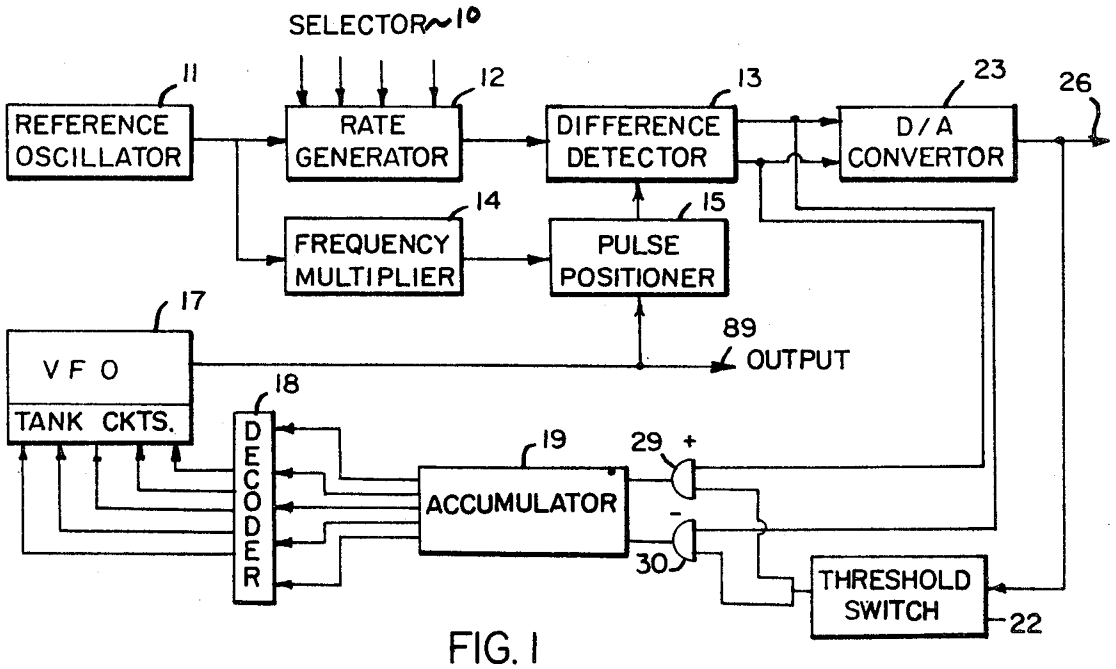
FIG. 1 is a block diagram of the basic frequency synthesizer.

Referring to FIG. 1, reference oscillator 11 is well known in the art and is further discussed more fully in the publication referred to above. Rate generator 12 is also discussed in this publication, as well as difference detector 13 and VFO 17 is discussed in detail in the publication.

Basically the system operates as follows: reference oscillator 11 produces a signal which is applied to rate generator 12. By means of selector 10, a specified frequency or pulse train is applied to difference detector 13. This difference detector produces a plus and minus signal by means of a comparison of the output of VFO 17 which has been applied to the difference detector 13 through pulses positioner 15. The plus signal indicates that the VFO output is greater than the signal applied by means of the rate generator and the minus signal indicates that the signal applied to the difference detector is such that the frequency of the VFO is less than the output of the rate generator 12. These signals are applied to gates 29 and 30, then to accumulator 19 which in essence is an up-down counter. When the rate of VFO is larger than the rate generator signal, the counter increases its stored number and, by means of decoder 18, certain elements of a tank circuit are switched in. As the signal difference is reduced as indicated by the signal applied to end gate 30, a lower number appears in the accumulator and the decoder accordingly switches out certain elements of the tank circuit. Accordingly, the signal from VFO 17 is constantly monitored by direct comparison with the output of rate generator 12. The difference between these two signals is a digital signal or pulse train and is converted by means of digital to analog converter 23 to an analog signal. When this signal decreases, threshold circuit 22 will be switched such that gates 29 and 30 will be disabled and VFO will remain at the specified or preselected output. If a new frequency is required by means of selector 10 the output of the rate generator is changed and, by means of the difference detector and the accumulator, a new equilibrium will be sought. A frequency generator that is extremely flexible and simple is thereby provided.

We should also note frequency multiplier 14 and pulse positioner 15 in this circuit. The purpose of this frequency multiplier and pulse positioner will best be understood by the problem that is solved.

VFO 17 and rate generator 12 produces pulse trains that are independent. When these two independent pulse trains are compared in the difference detector, if the pulses are not coincident or adequately spaced, the flip flops in the difference detector will not respond properly and spurious signals will be produced. In order to eliminate this, the pulse train output of VFO 17 must somehow be related to or positioned with reference to the reference oscillator 11. This is accomplished by means of frequency multiplier 14 and pulse positioner 15. Frequency multiplier 14 multiplies the output of reference oscillator at least four times.

The multiplied output controls the pulse positioner 15 in this manner: If an output 89 appears at 15 from VFO 17, it cannot be applied to the difference detector until a preselected pulse from the frequency multiplier is also applied to 15. Accordingly, the VFO output is effectively retimed in pulse positioner 15 in accordance with the multiplied frequency output of frequency multiplier 14. The signal 89 before it is applied to the difference detector 13 is carefully retimed to correlate with the reference oscillator 11.

The prior publication discusses in some detail all of the above components that are spoken of above with the exception of the threshold circuit, the accumulator, the pulse positioner, the frequency multiplier and the decoder, and accordingly some discussion of these elements follows. Frequency multiplier 14 is well known in the art and need not be discussed here. The threshold circuit 22 is also well known in the art and also need not be discussed here. The pulse positioner 15 and the accumulator 19, together with the decoder 18 are quite new and original to this particular invention and do require elaboration which will follow.

Figure 2:
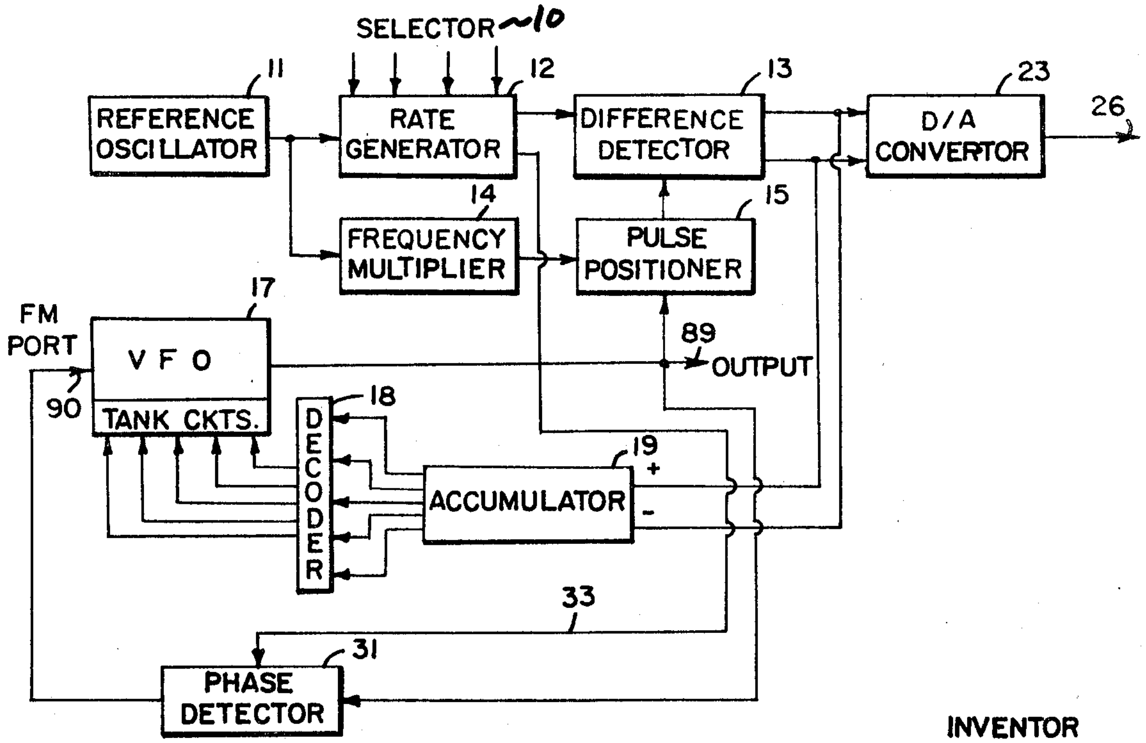
FIG. 2 is a frequency synthesizer with fine tuning.

Referring to FIG. 2, we see an identical circuit to that of FIG. 1 with certain minor modifications. These modifications enhance the device's operation to a considerable extent. Recalling for a moment the function of the threshold circuit in the earlier frequency generator, we note that the difference detector had an output which was used not only to drive the accumulator but to drive the digital to analog converter. If there was any difference between these two outputs, a threshold detector detected the magnitude of this output and if this output were too large, the threshold circuit remained inoperative; but as the signals got closer and closer together and thereby having no output of the difference detector, the threshold circuit would be switched and the input to the accumulator would be disabled and the VFO would then remain in the position that it was just prior to achieving the last frequency correction. The threshold circuit prevents hunting. However, greater precision can be attained with the aid of an automatic phase control loop.

This is accomplished with the aid of phase detector 31. Effectively, the lowest pulse rate from the rate generator switches 31 and thus samples a portion of the VFO output periodically with a brief duty cycle, and the output of the phase detector is applied to the FM port of the VFO. When the VFO frequency is within the capture range of the selected frequency, the output of 31 assumes the exact sign and magnitude to lock the VFO frequency. The rate difference detector 13 then remains quiescent until a different frequency is selected, or until the VFO drifts beyond the control range of the APC loop. In either case, the coarse tuning of the VFO is readjusted by the digital rate synthesis loop until lock is established again by the APC loop. This concept is further discussed on p. 2111 of the above publication.

In this discussion, so far, we have confined ourselves to a discussion of a frequency generator where by means of a selector we can generate any frequency we require and through frequency synthesis have an output 89 of greater spectral purity and at a stable frequency that we have chosen. We effectively have a very flexible frequency generator. However, with slight modification the above circuits can readily become a frequency meter. The VFO is replaced with the unknown frequency. The digital to analog converter is ordinarily applied to a display system—the difference is displayed—selector switch 10 could be switched or changed until such time as no difference between the reference oscillator generator signal and the unknown signal substituted for VFO 17 appeared. In this way, we have a frequency meter. To automate the operation decoder 18, instead of being applied to tank circuits of the VFO 17, would be applied to switches controlling selector 10 to such a point that when a frequency was applied, the rate generator would be automatically switched until a null was reached or indicated at output 26. Thus we also have a very complete frequency meter.

Figure 3:
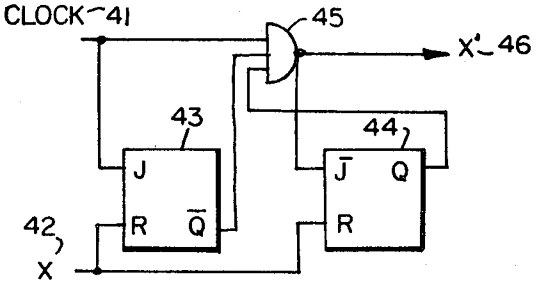
FIG. 3 shows a pulse positioning circuit.

Referring to FIG. 3, we see our pulse positioning circuit. Signal X 42 is applied to two flip flops 43 and 44 at R. A clock pulse 41 is applied to flip flop 43 at J and through a gate circuit 45 to both terminals as an output X′ 46 and to flip flop at $\bar{J}$. We can see the functioning of the circuit best by wave diagrams of FIG. 4. The $n$ illustrates a period and $n+1$ illustrates a second period. X is shown as 42 and is a single pulse during a period $n$. A clock pulse train 41 is also shown. We see then that we have almost three distinct clock pulses during this period and if we recall the circuit layout showing FIG. 1 or FIG. 2, the input clock pulses had to be at least three times greater than the repetition rate of the signal from VFO 17 which is to be positioned. The pulse positioner is activated as shown. Flip flop 1–43 generates a pulse after being energized at one terminal, both flip flops are energized or reset by pulse X. When X goes to 0 again, both flip flops are unclamped. During X equals 0 a clock pulse will equal to 1 and accordingly will set flip flop 1. During flip flop 1 being equal to 1, a clock pulse will then swing to 0 and is selected for output. The end of the output pulse X′ sets flip flop 2–44. When flip flop 1 blocks output due to the clock pulse 0 and we start at the beginning again, $X=1$ which resets flip flop 2, etc. In this example of the pulse positioning circuit, the clock pulses must have a rate at least three times greater than the rate of the pulses supplied by X.

Figure 4:
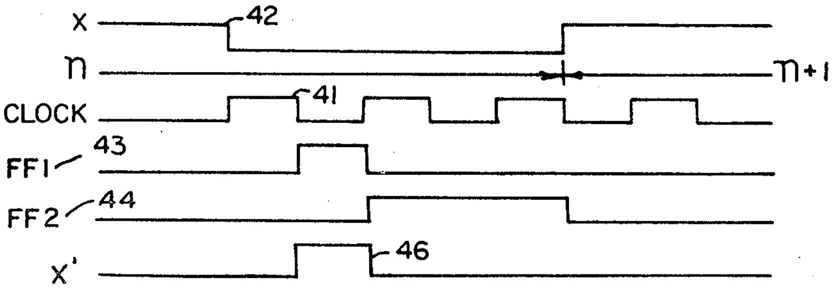
FIG. 4 shows wave diagrams in their application to the circuit of FIG. 3.

Thus we have seen from FIG. 3 and the accompanying wave diagram of FIG. 4 that the pulses X are retimed and then applied to the difference detector. We note that only the same number of pulses that are produced by X are permitted to be applied to the difference detector, no new pulses are permitted.

As shown, no problem in pulse position is experienced; however, the X pulse can occur much later and only one pulse from the timing circuit will pass. In essence, the negative going X causes the output to generate a pulse in conformance with the next negative half cycle of the clock or the one immediately thereafter.

Figure 5:
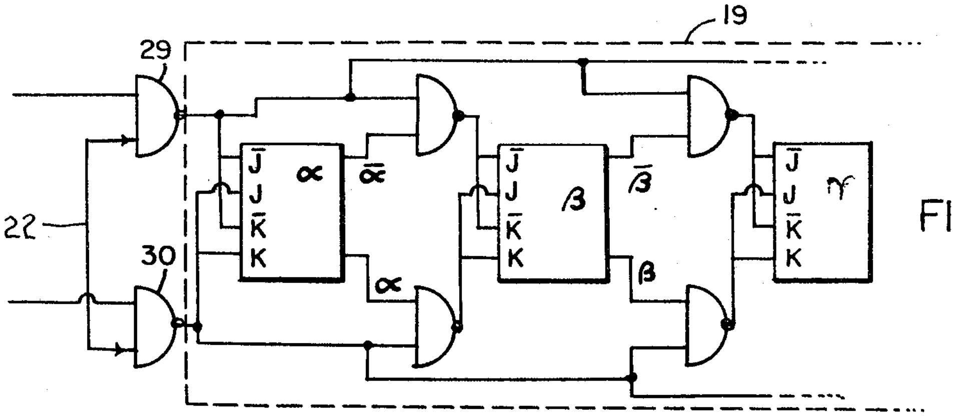
FIG. 5 shows an accumulator.

Referring now to FIG. 5, we see accumulator 19. The accumulator is composed of flip flops and gate circuits. We see in gates 29 and 30 which are energized by the threshold circuit 22. Accordingly, as a pulse appears at 29 or 30, it is permitted to pass and drive the flip flops. Assuming that a signal is received at 29 and flip flop alpha is driven up one and if another pulse is received at 29, alpha, by means of gates, is driven up and we then have two in the up counter. As another pulse is received at 29, the counter goes up to 3 and 4 and 5 and so forth as any ordinary counter would respond. However, if the signal varies and a pulse appears at 30, the counter is then driven downward by means of the interconnection at J and K. Accordingly, we see a simple up-down counter. However, the value of the up-down counter lies in the fact that it integrates the applied signals. Instead of causing the tank circuits to be switched in and switched out too rapidly, the counter absorbs vagaries in the pulse trains and does not issue any incorrect commands.

Figure 6:
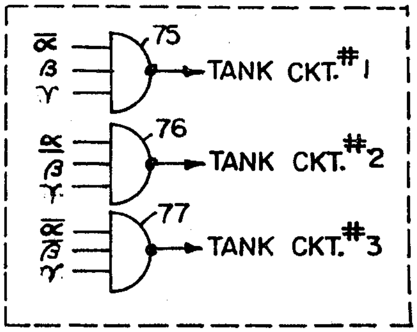
FIG. 6 shows a decoding circuit.

Referring to FIG. 6, we see a decoder 18 which consists of gates 75, 76 and 77. We also see inputs of alpha, beta and gamma. When alpha is 1 and beta and gamma are 0, then tank circuit 1 will be energized. When alpha is 0 and beta is 1 and gamma is 0, tank circuit 2 will be energized and when gamma is 1 and alpha and beta are 0 tank circuit 3 is energized. In accordance with our input to our up-down counter, the tank circuits are effectively switched in or out, thus controlling the variable frequency oscillator in the same manner that the motor which was shown in the previous publications. Using static components, a much swifter response to signals is accomplished. Furthermore, lightweight and small bulk are considerably enhanced. This circuit just described is composed of a number of flip flops and gate circuits which are well known in the art and which are very well developed in the fiield of micro-circuits, thus providing a considerable advance in D.R.S.

Although the invention contemplates the use of semiconductor switches controlled by the decoder in order to retain all static components, reed relays or other similar magnetic devices may obviously be used to switch in the various tuning circuits. Employing magnetic devices will permit much larger currents to be employed which may be needed to control a large VFO.

As we have seen, the output of the VFO has had its signal properly positioned and then compared in the difference detector; the output of the difference detector would be the sum and difference of the two pulse trains which are applied to the accumulator. The accumulator being effectively an up-down counter would switch through a digital system a number of tank circuits controlling the VFO in or out of the circuit. The inventor has discovered that when a quiescent point (or the point where both pulse trains are in agreement) is approached, jitters may develop within the circuit and accordingly hunting and other undesirable circuit developments occur. The threshold circuit was introduced which would disable the input from the difference through gates 29 and 30 to the accumulator.

Figure 7:
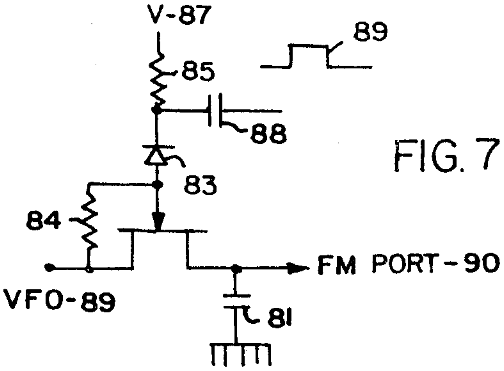
FIG. 7 shows a phase detector.
Figure 8:
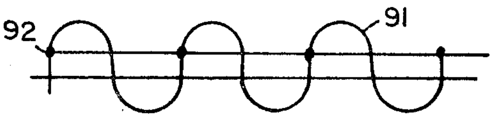
FIG. 8 shows the wave diagram related to FIG. 8.

As was noted earlier, in order to get precise or fine tuning, the threshold circuit may be undesirable and accordingly FIG. 7 shows a phase detector. The VFO output 89 as applied to one point in the circuit and if the circuit to gate 82 is open, it will be applied to the storage capacitor 81 and from there to the FM port 90. Gate 83 is controlled by pulses of the lowest digit from the rate generator 12. Here by means of the proper bias voltage 87, diode 83 and capacitor 88, the pulse 89 opens and closes gate 83 to yield a voltage across capacitor 81 in close agreement with the phase difference between the two signals. Referring to FIG. 8, we see that if the signal 91 corresponds to the VFO output, then a sampling at every point 92 on the wavefore will provide a specified signal which will vary from the peak output of the wave in accordance with the phase difference between signals. As the signal frequency approaches agreement with a multiple of the lowest digit rate 33, we will have the desired correction output to FM port 90. This circuit is quite clever in that effectively you have stroboscopic sampling of the output of the VFO to detect slight phase differences between it and a submultiple of the reference oscillator output and can use this signal to control the VFO by means of FM port 90. The lowest digit was used in order to permit the circuit to operate with any setting of selector 10.

The success of the system described so far depends on instantaneous translation of the accumulator count into VFO frequency. However, in many designs a change in count in the accumulator will entail transient perturbations of the VFO frequency as it passes from the initial to the final value; such transients can preclude the closed loop from attaining equilibrium.

The use of a threshold circuit for disabling the gates at the input to the accumulator in many instances is a partial remedy. Other stabilizing means comprising additional filters of the digital type may be needed in the loop. As a specific example: gates can be provided at the input to the rate difference detector and they will be temporarily disabled when the more significant digits of the accumulator change. The implementation of a stabilizing circuit of this nature is to sense a string of "ones" (or "zeros") in excess of a predetermined length in the accumulator; the arrival of an additive (or subtractive) pulse is then used to disable the gates at the input to the rate difference detector for a time of adequate duration to permit the VFO frequency to attain the value appropriate to the new count.

The details of such stabilizing circuits will readily be worked out by those skilled in the art of digital techniques. It can be pointed out however, that the A.P.C. loop is always present as shown in FIG. 2 and suitably designed will tend to lock the VFO frequency at some multiple of the phase detector switching rate within a few periods of the latter. Thus the time during which the gates to the rate difference detector above would be disabled need not exceed three or four periods of the lowest switching rate.

Drift compensation without frequency transients may be desired and could be achieved as follows: a tie between accumulator 19 and phase detector 31 is established. As the magnitude of the detector exceeds a certain threshold (approximately 60%) a pulse is added or subtracted from the accumulator. A threshold circuit would sample the phase detector output while a high gain differential amplifier would sample the sign of its output. With the output of a multivibrator controlled by the threshold circuit and two gates controlled by the differential amplifier a "+" or "−" pulse will be applied to the accumulator. This last step produces a phase transient in place of what might be a frequency transient by reducing the phase offset directly.

We thus come to the completion of the disclosure, which from an overall view describes a frequency synthesizer characterized by coarse and fine tuning. The coarse tuning is provided by way of tang circuit selection and fine tuning by way of the FM port. Furthermore, the present invention discloses a frequency meter of the same concept as the generator.

What is claimed is:

1. A frequency synthesizer comprising:

reference oscillator means;

rate generator means for converting said reference oscillator output into a preselected rate;

means for controlling the output of said rate generator;

difference detector means;

variable frequency oscillator having preselected tank circuits;

said difference detector having inputs for comparing the output of the rate generator and the variable frequency oscillator and producing a positive and negative output in accordance with the frequency difference of said input signals, digital to analog converter for converting the output difference of said difference detector into an anolog signal;

accumulator means for integrating said plus and minus difference output signals and producing a control signal;

decoder means for converting said control signal into a preselected switching signal for enabling said tank circuits of said variable frequency oscillator.

2. A frequency synthesizer according to claim 1 which further includes:

frequency multiplier means for increasing the reference oscillator frequency by a preselected factor;

pulse positioning means for retiming the variable frequency oscillator output in accordance with said multiplied reference oscillator output before applying said variable frequency oscillator output to said difference detector.

3. A frequency synthesizer according to claim 2 which further includes:

gating means controlling the input to said accumulator;

threshold detection means for disabling said gating means in accordance with the level of difference between said compared signals in said difference detector.

4. A frequency synthesizer according to claim 2 which further includes:

phase detection means;

said phase detection means generating a signal for application to the FM part of said variable frequency oscillator in accordance with the phase difference of the output of said variable frequency oscillator and a preselected digit output of the rate generator.

5. A frequeuncy synthesizer according to claim 4 which further includes:

means for detecting the magnitude of the phase detector output;

means for detecting the sign of the phase detector output;

means for generating a pulse in accordance with preselected output of said phase detection;

means for inserting said generated pulse as a "plus" or a "minus" pulse into said accumulator in accordance with said sign detecting means.

6. A frequency meter comprising:

a reference oscillator;

a rate generator for converting said reference oscillator output into a preselected pulse train of preselected frequency;

means for selecting the rate generator's output frequency;

difference detector means for receiving the output of said rate generator and an input frequency signal to be measured and having a plus and minus output in accordance with the frequency difference in applied signals;

a frequency multiplier for multiplying the output of said reference oscillator by a preselected integer;

a pulse positioner for positioning the input frequency signal in accordance with said multiplied reference oscillator signal before applying said signal to the difference detector;

digital to analog conversion means for changing said plus and minus output to an analog signal;

means for displaying said analog output.

7. A frequency meter in accordance with claim 6 which further includes:

an accumulator for receiving the output of said difference detector;

a decoder for detecting the state of said accumulator and applying said detected signal to the selector of said rate generator;

indicator means for reading the state of the accumulator.

8. A frequency meter in accordance with claim 7 which further includes:

a threshold detector for detecting the output of said digital to analog converter;

gating means responsive to said threshold detector for cutting out the input to said accumulator.

References Cited

UNITED STATES PATENTS

| | | | |
|---|---|---|---|
| 2,888,643 | 5/1959 | Summerhayes | 324—82 |
| 3,092,736 | 6/1963 | Ernyei | 328—134 X |
| 3,283,254 | 11/1966 | Haynie. | |
| 3,329,895 | 7/1967 | Lenz. | |

OTHER REFERENCES

Rey, T. J.: Digital Rate Synthesis for Frequency Measurement and Control, IRE Proc. vol. 47, No. 12, pp. 2106–12 (December 1959).

ALFRED E. SMITH, Primary Examiner

U.S. Cl. X.R.

325—416; 328—134; 331—18